(12) United States Patent
Thörn

(10) Patent No.: US 8,988,373 B2
(45) Date of Patent: Mar. 24, 2015

(54) SKIN INPUT VIA TACTILE TAGS

(75) Inventor: Ola Thörn, Limhamn (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 404 days.

(21) Appl. No.: 13/442,429

(22) Filed: Apr. 9, 2012

(65) Prior Publication Data

US 2013/0265241 A1    Oct. 10, 2013

(51) Int. Cl.
G06F 3/041    (2006.01)
G06F 3/01    (2006.01)
G02B 27/01    (2006.01)

(52) U.S. Cl.
CPC .............. *G06F 3/011* (2013.01); *G06F 3/013* (2013.01); *G06F 3/015* (2013.01); *G06F 3/016* (2013.01); *G06F 3/017* (2013.01); *G02B 27/017* (2013.01); *G02B 2027/014* (2013.01)
USPC ........................................................ 345/173

(58) Field of Classification Search
CPC ....... G06F 3/0041; G06F 3/043; G06F 3/045; G09G 5/00
USPC ................................................ 345/156–178
See application file for complete search history.

(56) References Cited

U.S. PATENT DOCUMENTS

| | | | |
|---|---|---|---|
| 6,380,923 B1 * | 4/2002 | Fukumoto et al. | 345/156 |
| 7,148,879 B2 * | 12/2006 | Amento et al. | 345/158 |
| 2003/0123328 A1 * | 7/2003 | Guanter | 368/82 |
| 2010/0066664 A1 * | 3/2010 | Son et al. | 345/156 |
| 2012/0249409 A1 * | 10/2012 | Toney et al. | 345/156 |
| 2013/0135223 A1 * | 5/2013 | Shai | 345/173 |

FOREIGN PATENT DOCUMENTS

WO    WO 2011070554 A2 *    6/2011

OTHER PUBLICATIONS

Skinput: Appropriating the Body as an Input Surface. www.chrisharrison.net/index.php/Research/Skinput, Jul. 6, 2012.
Harrison, C., Tan, D. Morris, D. 2010. Skinput: Appropriating the Body as an Input Surface. In Proceedings of the 28th Annual SIGCHI Conference on Human Factors in Computing Systems (Atlanta, Georgia, Apr. 10-15, 2010). CHI '10. ACM, New York, NY. 453-462.

* cited by examiner

*Primary Examiner* — Kent Chang
*Assistant Examiner* — Nathan Brittingham
(74) *Attorney, Agent, or Firm* — Sreenivas Vedantam; Moore & Van Allen PLLC

(57) ABSTRACT

The invention is directed to systems, methods and computer program products for determining an input instruction based on a touch associated with a tactile tag. An exemplary method includes detecting, by a device in contact with a user's body, a touch on the user's skin by a tactile tag. The tactile tag comprises a three-dimensional pattern, and the three-dimensional pattern causes a vibration in the user's body when a surface of the tactile tag touches the user's skin. The method additionally includes determining at least one characteristic associated with the touch; and determining an input instruction based at least partially on the at least one characteristic associated with the touch.

19 Claims, 8 Drawing Sheets

SKIN INPUT VIA TACTILE TAGS

BACKGROUND

When a user wants to manipulate a function associated with a device, the user accesses a user interface associated with the device. The user interface enables the user to input one or more input instructions. The user interface may be provided on an input system that is separate from the device, or on an input system that is integrated into the device. What is needed is a more convenient user interface to use when compared to existing user interfaces.

BRIEF SUMMARY

Embodiments of the invention are directed to systems, methods and computer program products for determining an input instruction based on a touch associated with a tactile tag. In some embodiments, a method is provided for determining an input instruction. The method comprises: detecting, by a device in contact with a user's body, a touch on the user's skin by a tactile tag, wherein the tactile tag comprises a three-dimensional pattern, wherein the three-dimensional pattern causes a vibration in the user's body when a surface of the tactile tag touches the user's skin; determining at least one characteristic associated with the touch; and determining an input instruction based at least partially on the at least one characteristic associated with the touch.

In some embodiments, the at least one characteristic comprises at least one of a type of touch, an approximate location of the touch, a duration of the touch, a pressure or force associated with the touch, a speed or acceleration associated with the touch, a quantity of distinct touches comprised in the touch, a duration between distinct touches comprised in the touch, a direction of the user's gaze when the touch occurs, or a direction associated with a body part associated with the user when the touch occurs.

In some embodiments, a first type of touch is a tap touch and a second type of touch is a drag touch.

In some embodiments, the vibration is associated with at least one of a distinct frequency or distinct amplitude.

In some embodiments, the determining an input instruction based at least partially on the at least one characteristic associated with the touch further comprises: determining whether at least one characteristic associated with the touch substantially matches at least one characteristic associated with a stored touch, wherein the stored touch is comprised in a database comprising a plurality of stored touches, wherein the database is located in the device; and determining an input instruction associated with the stored touch when the at least one characteristic associated with the touch substantially matches the at least one characteristic associated with the stored touch.

In some embodiments, the input instruction comprises a message, and the method further comprises transmitting the input instruction to another device.

In some embodiments, the tactile tag is detachably affixed to a band or bracelet that is wearable on the user's body.

In some embodiments, the band or bracelet comprises at least one piezoelectric microphone.

In some embodiments, the determining an input instruction based at least partially on the at least one characteristic associated with the touch further comprises: determining a pressure or force associated with the touch; comparing the pressure or force with a predetermined pressure or force; and in response to determining the pressure or force is greater than the predetermined pressure or force, determining an input instruction based at least partially on the at least one characteristic associated with the touch.

In some embodiments, the tactile tag is either in contact with or not in contact with the user's body prior to the detecting step.

In some embodiments, at least some portion of a surface of the tactile tag is raised above a horizontal plane associated with the tactile tag, and wherein at least some portion of the surface of the tactile tag is depressed below the horizontal plane.

In some embodiments, the vibration comprises at least one of a first vibration produced in the user's first body part and a second vibration produced in the user's second body part.

In some embodiments, the first vibration produced in the user's first body part is caused by a first surface (e.g., a bottom surface) of the tactile tag touching the user's first body part, and the second vibration produced in the user's second body part (e.g., a top surface) is caused by a second surface of the tactile tag touching the user's second body part.

In some embodiments, the input instruction comprises an instruction to project, using the device, a user interface onto a portion of the user's skin.

In some embodiments, the method further comprises determining an approximate point of the touch on the user's skin, wherein the point of the touch is at least one of a center point or a corner point of the projected user interface.

In some embodiments, the method further comprises encrypting the input instruction, and transmitting the encrypted input instruction to another device.

In some embodiments, the touch is a first touch, the tactile tag is a first tactile tag, the vibration is a first vibration, and the input instruction is a first input instruction, and the method further comprises: detecting, by the device, a second touch on the user's skin by a second tactile tag, wherein the second touch is detected substantially simultaneously with the first touch; distinguishing the first vibration associated with the first touch from a second vibration associated with the second touch; determining at least one characteristic associated with the second touch; and determining a second input instruction based at least partially on the at least one characteristic associated with the second touch.

In some embodiments, the tactile tag at least one of transmits information to or receives information from the device or a different device.

In some embodiments, the method further comprises at least one of printing the tactile tag using a printer, or enabling modification of at least one of the three-dimensional pattern or an input instruction associated with the touch.

In some embodiments, the method further comprises reconstructing the three-dimensional pattern associated with the tactile tag based at least partially on the determined at least one characteristic associated with the touch.

In some embodiments, a system is provided for determining an input instruction. In some embodiments, the system comprises a device, in contact with a user's body, and configured to: detect a touch on a user's skin by a tactile tag, wherein the tactile tag comprises a three-dimensional pattern, wherein the three-dimensional pattern causes a vibration in the user's body when a surface of the tactile tag touches the user's skin; determine at least one characteristic associated with the touch; and determine an input instruction based at least partially on the at least one characteristic associated with the touch.

In some embodiments, a computer program product is provided for determining an input instruction. In some embodiments, the computer program product comprises a non-transitory computer-readable medium comprising code configured to: detect a touch on a user's skin by a tactile tag, wherein the tactile tag comprises a three-dimensional pattern, wherein the three-dimensional pattern causes a vibration in the user's body when a surface of the tactile tag touches the user's skin; determine at least one characteristic associated with the touch; and determine an input instruction based at least partially on the at least one characteristic associated with the touch.

In some embodiments, a tactile device is provided for determining an input instruction. The tactile device comprises a body, wherein an exterior surface of the body comprises a three-dimensional surface pattern, wherein a first part of the exterior surface comprises a first set of crests and troughs and a second part of the exterior surface comprises a second set of crests and troughs; at least one piezoelectric microphone for detecting a vibration when the tactile device touches a user's skin; and a processor for: determining whether the vibration is greater than a predetermined threshold, in response to determining the vibration is greater than a predetermined threshold, determining at least one characteristic associated with the touch, and determining an input instruction based at least partially on determining the at least one characteristic associated with the touch, wherein the at least one characteristic associated with the touch comprises a type of touch and a determination of which part of the exterior surface touched the user's skin.

In some embodiments, the body has at least one of a substantially spherical, egg-like, tubular, cuboidal, or cubical shape.

In some embodiments, the at least one characteristic further comprises at least one of: an approximate location of the touch on the user's skin, a duration of the touch, a pressure or force associated with the touch, a speed or acceleration associated with the touch, a quantity of distinct touches by the tactile device on the user's skin, a duration between distinct touches of the tactile device on the user's skin, a direction of the user's gaze when the touch occurs, or a direction associated with the user's body part when the touch occurs.

In some embodiments, the tactile device further comprises an image-capturing module.

In some embodiments, the processor further initiates the input instruction to a device to manipulate a function associated with the device.

In some embodiments, determining an input instruction further comprises: accessing a table of input instructions versus touch characteristics, determining whether the determined at least one characteristic substantially matches at least one stored characteristic in the table, and in response to determining the determined at least one characteristic substantially matches at least one stored characteristic in the table, determining an input instruction associated with the at least one stored characteristic, wherein the table is stored in the tactile device.

In some embodiments, the at least one piezoelectric microphone is located on at least one of an interior surface or an exterior surface of the body.

In some embodiments, the at least one piezoelectric microphone detects a second touch of a body part or an object on the user's skin, wherein the object is not the tactile device, and wherein the tactile device determines a second input instruction based on the second touch.

In some embodiments, the type of touch is at least one of a tap touch or drag touch.

In some embodiments, the type of touch is based at least partially on an amplitude or a frequency associated with the vibration.

In some embodiments, the table of input instructions versus touch characteristics may be modified by a user.

In some embodiments, the touch is a first touch associated with a first part of the exterior surface of the tactile device body and wherein the vibration is a first vibration, and wherein the at least one piezoelectric microphone detects a second vibration when a second part of the exterior surface of the tactile device body touches the user's skin substantially simultaneously with the first touch.

In some embodiments, the processor is further for: determining that the first vibration is associated with at least one of a greater force, pressure, or amplitude when compared to the second vibration; and ignoring the second vibration.

In some embodiments, the processor is further for: determining whether the second vibration is greater than the predetermined threshold, in response to determining the second vibration is greater than the predetermined threshold, determining at least one characteristic associated with the second touch, and determining a second input instruction based at least partially on determining the at least one characteristic associated with the second touch, wherein the at least one characteristic associated with the second touch comprises a type of touch and a determination of which part of the exterior surface touched the user's skin.

In some embodiments, a method is provided for determining an input instruction. The method comprises: providing a tactile device comprising a body, wherein an exterior surface of the body comprises a three-dimensional surface pattern, wherein a first part of the exterior surface comprises a first set of crests and troughs and a second part of the exterior surface comprises a second set of crests and troughs, and at least one piezoelectric microphone for detecting a vibration when the tactile device touches a user's skin; determining whether the vibration is greater than a predetermined threshold; in response to determining the vibration is greater than a predetermined threshold, determining at least one characteristic associated with the touch; and determining an input instruction based at least partially on determining the at least one characteristic associated with the touch, wherein the at least one characteristic associated with the touch comprises a type of touch and a determination of which part of the exterior surface touched the user's skin.

In some embodiments, a computer program product is provided for determining an input instruction. The computer program product comprises a non-transitory computer-readable medium comprising code for: determining whether a vibration is greater than a predetermined threshold, wherein the vibration is detected by at least one piezoelectric microphone comprised in a tactile device, wherein the tactile device touches a user's skin, wherein the tactile device comprises a body, wherein an exterior surface of the body comprises a three-dimensional surface pattern, and wherein a first part of the exterior surface comprises a first set of crests and troughs and a second part of the exterior surface comprises a second set of crests and troughs; in response to determining the vibration is greater than a predetermined threshold, determining at least one characteristic associated with the touch; and determining an input instruction based at least partially on determining the at least one characteristic associated with the touch, wherein the at least one characteristic associated with the touch comprises a type of touch and a determination of which part of the exterior surface touched the user's skin.

BRIEF DESCRIPTION OF THE DRAWINGS

Figure 1:
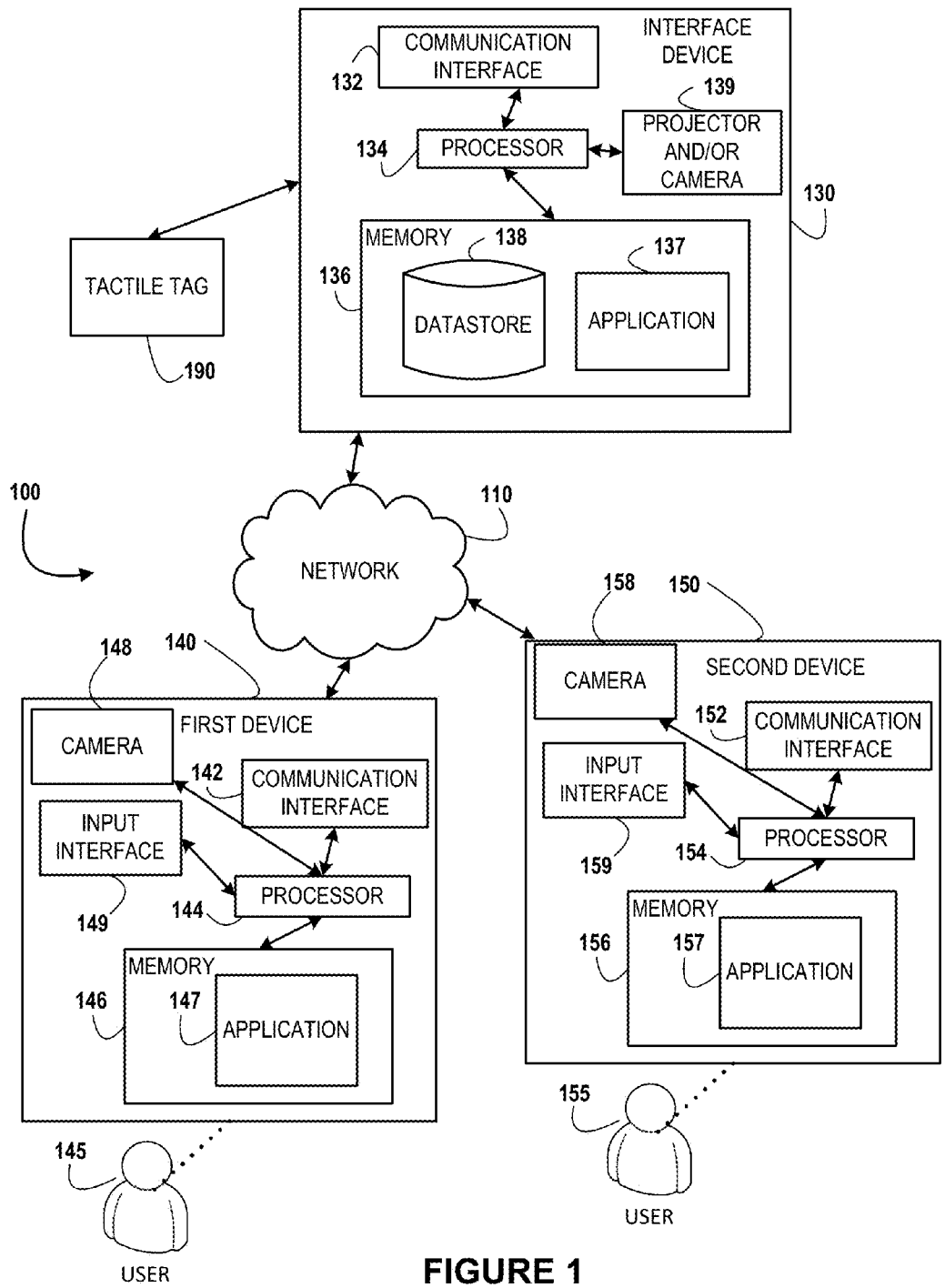
Figure 2:
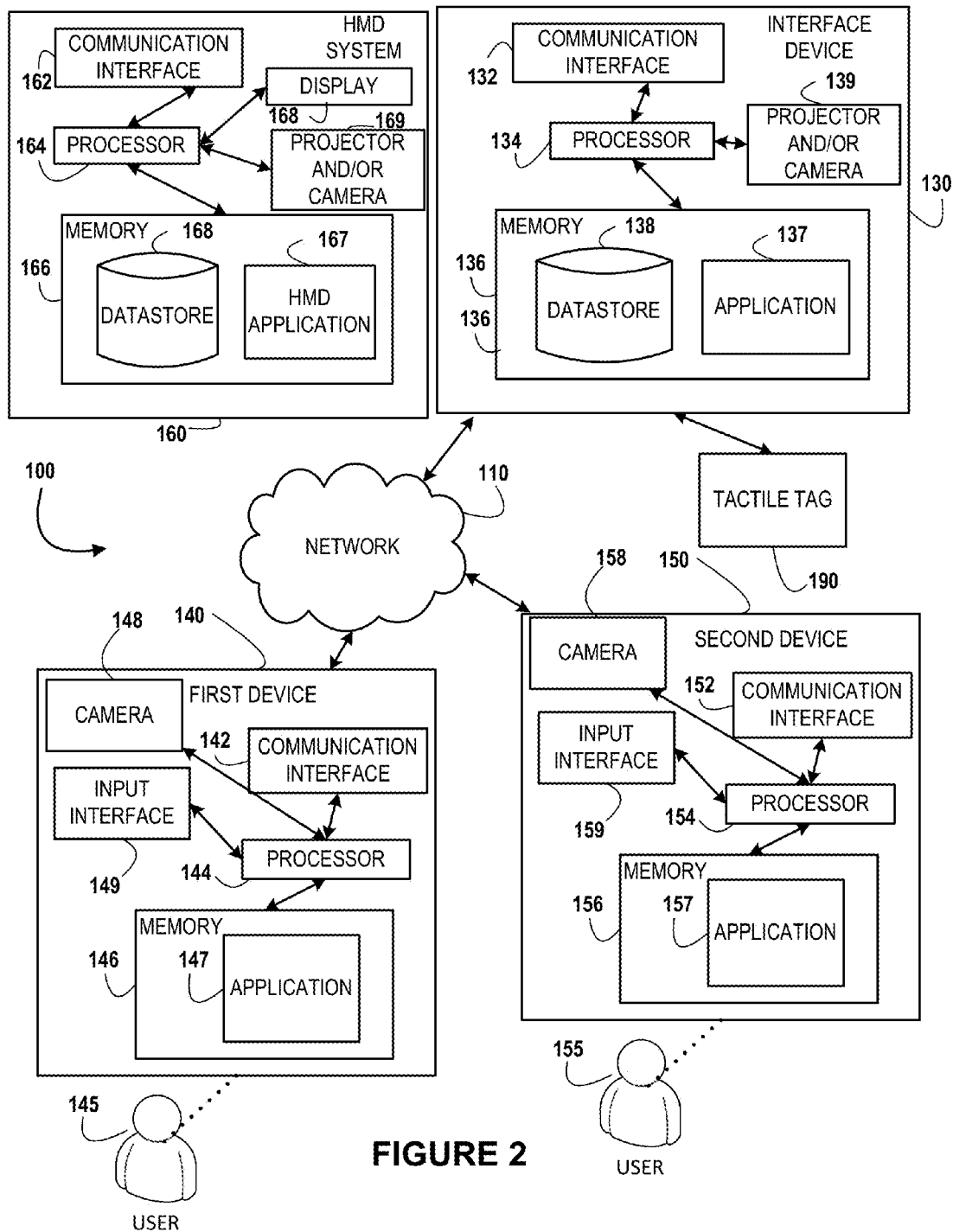
Figure 3:
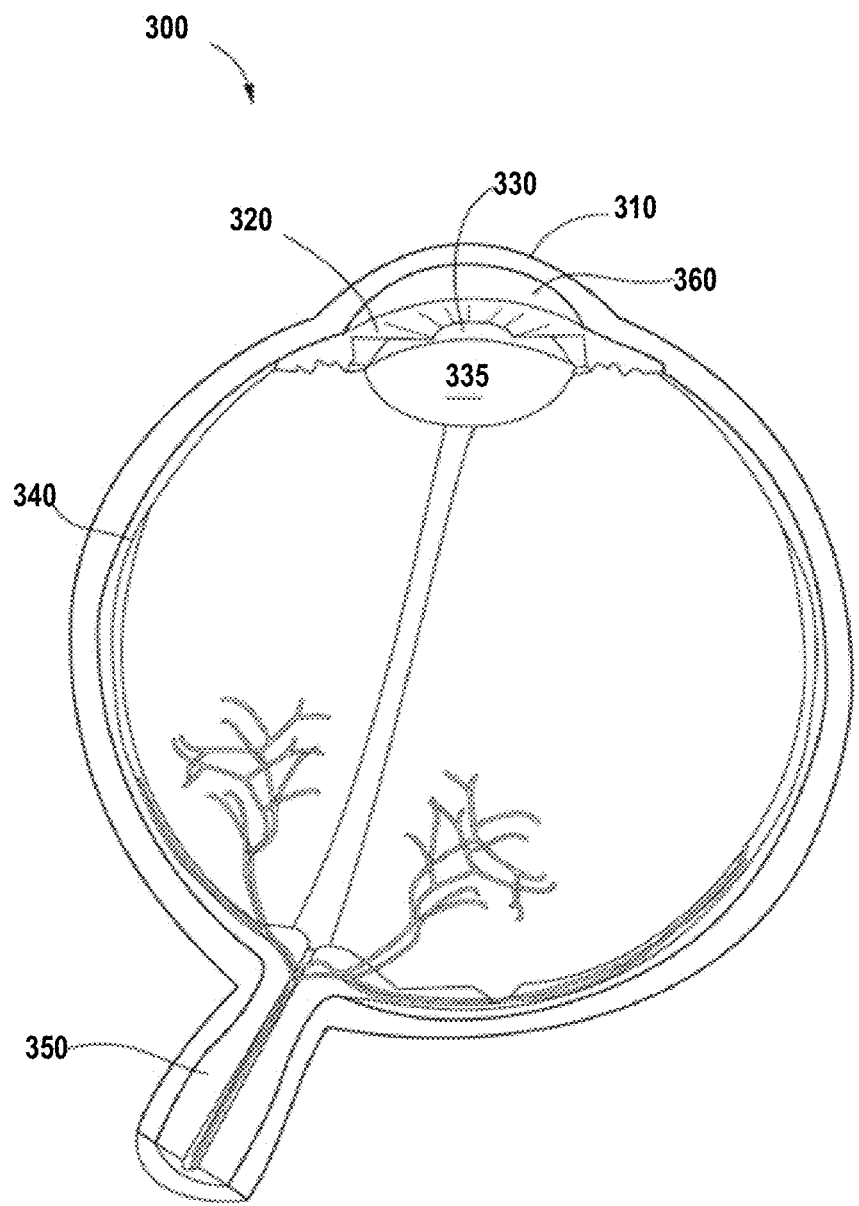
Figure 4:
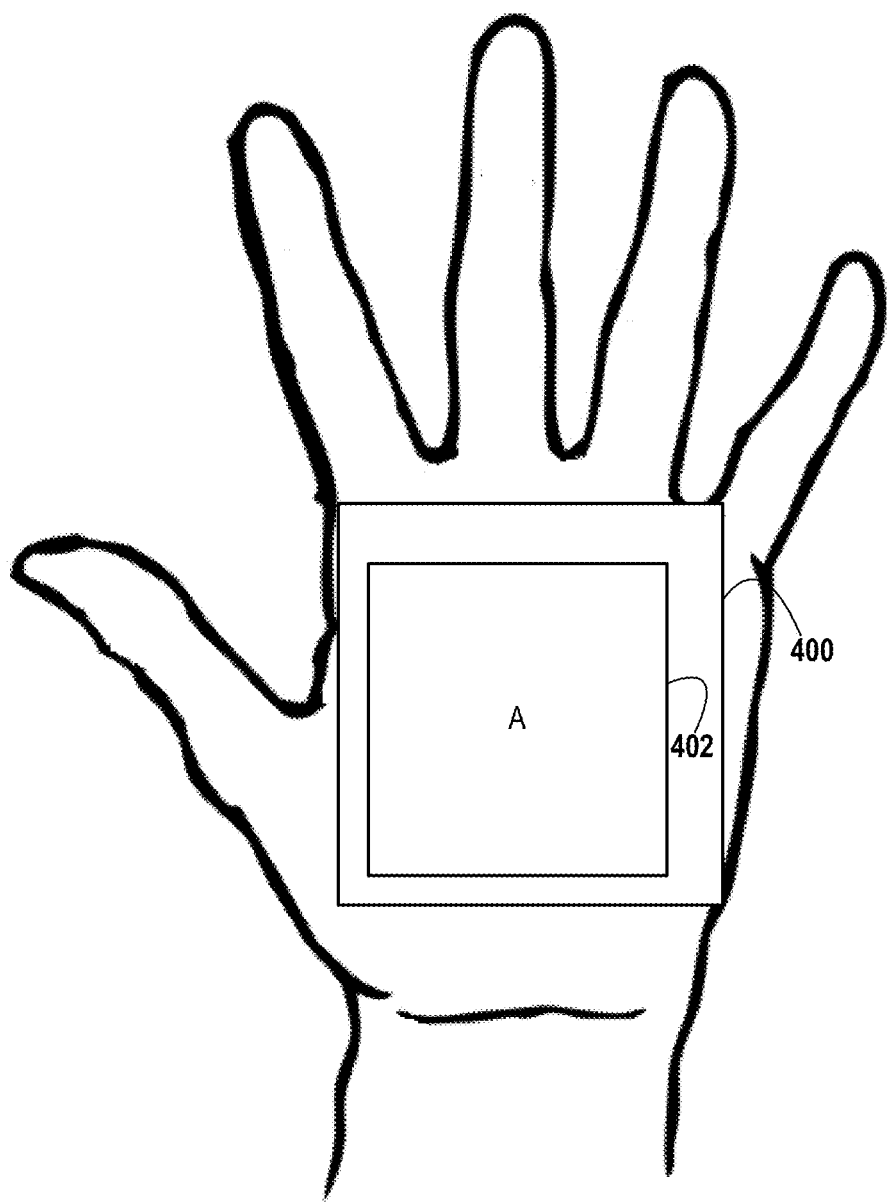
Figure 5:
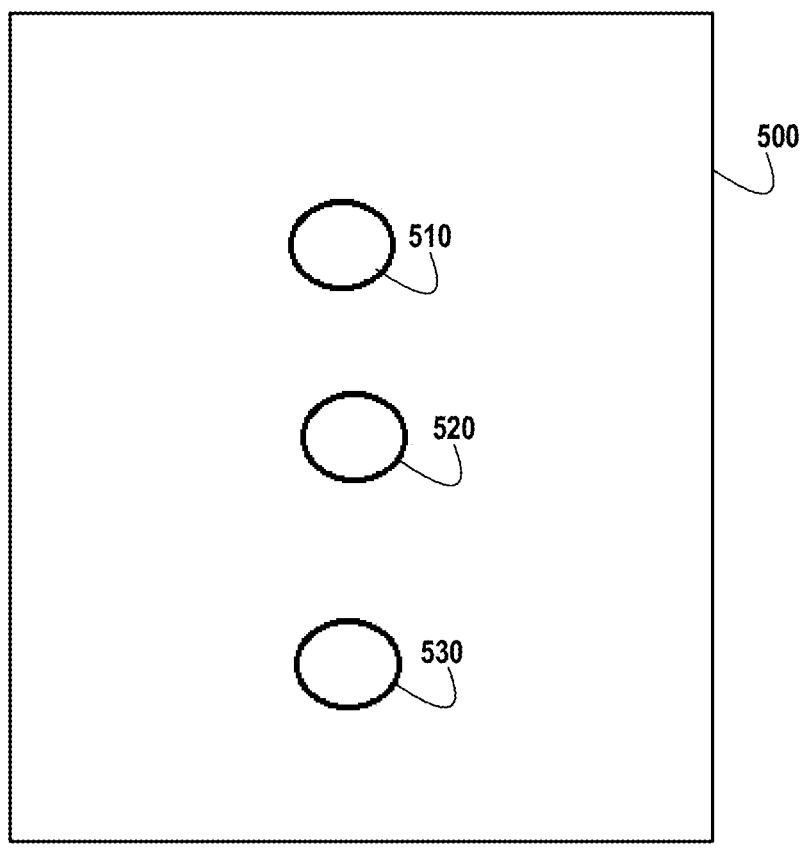
Figure 6:
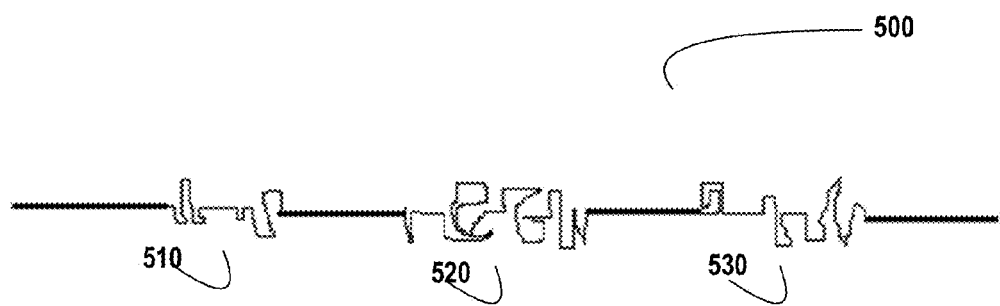
Figure 7:
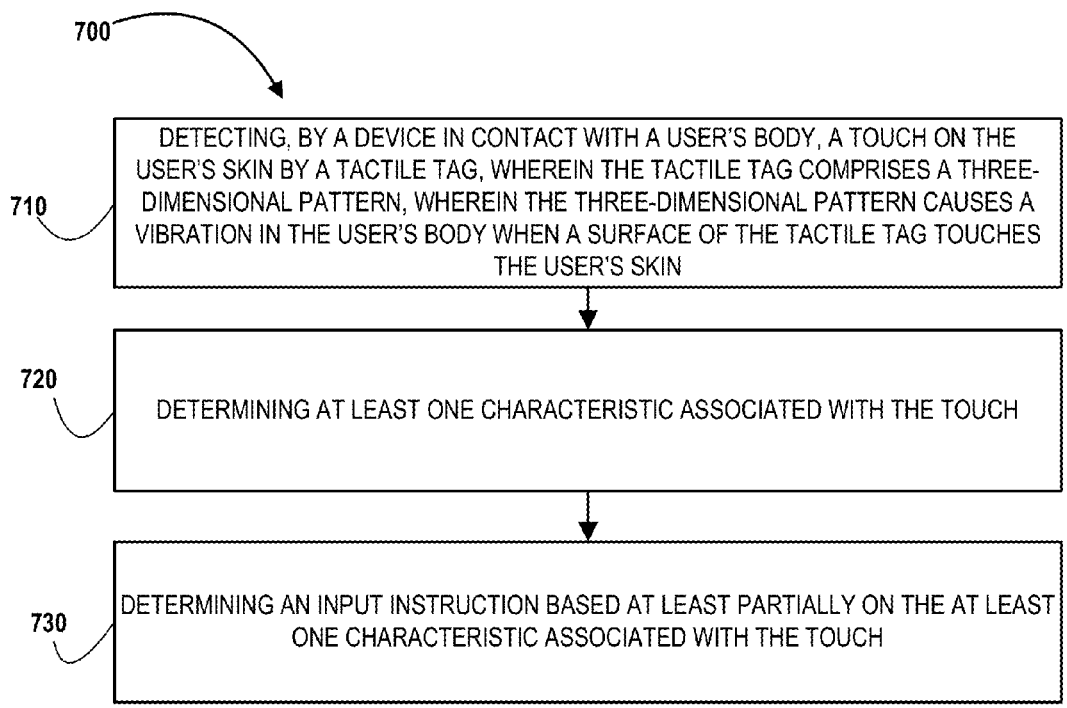
Figure 8:
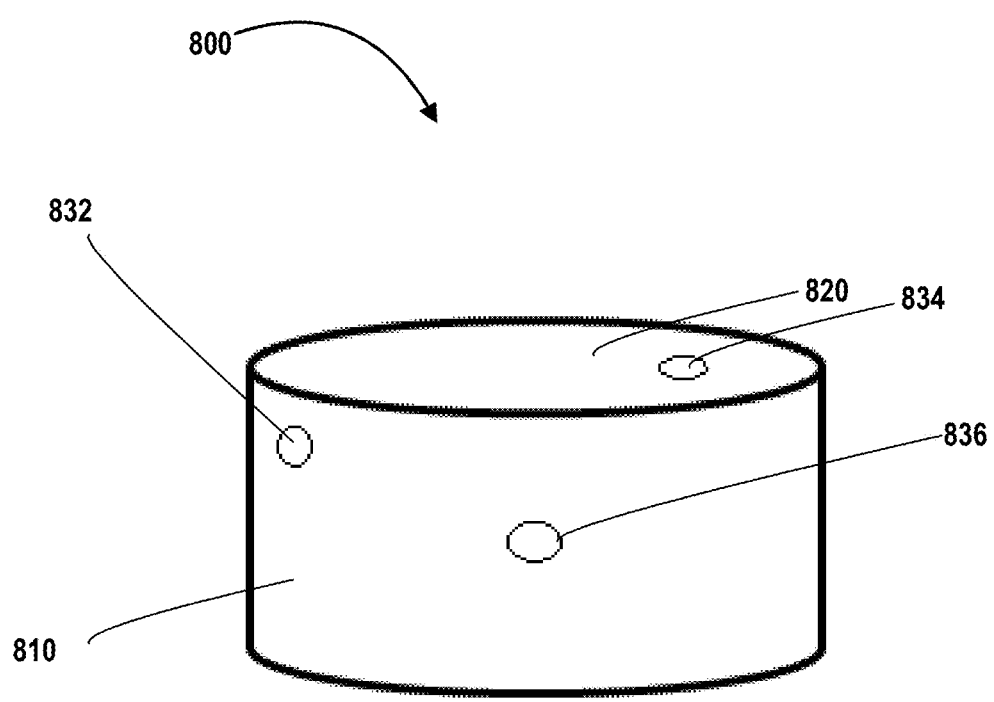

Having thus described embodiments of the invention in general terms, reference will now be made to the accompanying drawings, where:

FIG. 1 is an exemplary system environment for determining an input instruction using input via a tactile tag, in accordance with embodiments of the present invention;

FIG. 2 is another exemplary system environment for determining an input instruction using input via a tactile tag, in accordance with embodiments of the present invention;

FIG. 3 is an exemplary picture of the parts of an eye;

FIG. 4 is an exemplary user interface projected onto the user's skin by the interface device, in accordance with embodiments of the present invention;

FIG. 5 is an exemplary band or bracelet comprising at least one tactile tag, in accordance with embodiments of the present invention;

FIG. 6 is another exemplary view of the at least one tactile tag, in accordance with embodiments of the present invention;

FIG. 7 is an exemplary process flow associated with generating an input instruction in response to a touch on the at least one tactile tag, in accordance with embodiments of the present invention; and FIG. 8 is an exemplary tactile device, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Skin input refers to providing input to an interface device via the user's skin. An interface device enabled to receive skin input detects contact (or a tap) associated with one or more portions of the user's skin and converts the detected contact to an input instruction.

Embodiments of the invention are directed to systems, methods, and computer program products for determining an input instruction based on a touch associated with a tactile tag. An exemplary method includes detecting, by a device in contact with a user's body, a touch on the user's skin by a tactile tag. The tactile tag comprises a three-dimensional pattern, and the three-dimensional pattern causes a vibration in the user's body when a surface of the tactile tag touches the user's skin. The method additionally includes determining at least one characteristic associated with the touch; and determining an input instruction based at least partially on the at least one characteristic associated with the touch.

Referring now to FIG. 1, FIG. 1 presents a system environment for determining an input instruction based on a touch associated with a tactile tag. FIG. 1 presents a first device 140, a second device 150, and an interface device 130. Examples of the first device 140 and/or the second device 150 include, but are not limited to, mobile computing devices (e.g., mobile phones), image-capturing devices (e.g., cameras), gaming devices, laptop computers, portable media players, tablet computers, e-readers, scanners, watches, other portable or non-portable computing or non-computing devices, as well as, in some embodiments, one or more components thereof and/or one or more peripheral devices associated therewith.

Each of the first device 140 and the second device 150 may comprise an input interface 149 and 159, a communication interface 142 and 152, a processor 144 and 154, and a memory 146 and 156. The input interface 149 and 159 may comprise one or more user input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 145 and 155 and/or some other user. In some embodiments, the input interface 149 and 159 includes the input and display devices of a personal computer, such as a keyboard and monitor, which are operable to receive and display information. The communication interface 142 and 152 may permit the devices 140 and 150 to communicate with the other devices presented in FIG. 1. The processor 144 and 154 may be used to execute an application 147 and 157 (e.g., a transmitting and/or receiving application stored in the memory). Additionally, the first device 140 and the second device 150 may comprise a camera or other image-capturing module 148 and 158. Although not shown in FIG. 1, both the first device 140 and the second device 150 may comprise one or more datastores. In some embodiments, the user 145 and the user 155 may be the same user.

The interface device 130 may comprise a communication interface 132, a processor 134, a memory 136, and a projector and/or camera or other image-capturing module 139. The communication interface 132 may enable the interface device 130 to interact with the other device presented in FIG. 1. The processor 134 may be used to execute an application 137 comprised in the memory 136. Example applications include an application to project an interface onto a user's skin using the projector 139, or to determine a direction associated with a user's gaze or a user's body part using the camera or other image-capturing module 139. Additionally, the memory may comprise a datastore 138. The datastore 138 may temporarily or permanently store the data transmitted from the first and/or second device to the interface device 130. Any processor described herein may include functionality to operate one or more software programs based at least partially on computer-executable program code portions thereof, which may be stored, for example, in a memory device.

In some embodiments, as shown in FIG. 1, the devices are each operatively and selectively connected to the network 110, which may include one or more separate networks. In addition, the network 110 may include a local area network (LAN), a wide area network (WAN), and/or a global area network (GAN), such as the Internet. It will also be understood that the network 110 may be secure and/or unsecure and may also include wireless and/or wireline and/or optical interconnection technology. In other embodiments, each of the devices presented in FIG. 1 (and FIG. 2) may directly communicate with each other via one or more wired or wireless mechanisms (and do not communicate with each other via the network). Examples of wireless mechanisms include near-field communication (NFC), infrared transmission (IR), Bluetooth, short-range radio frequency (RF) signals, IEEE 802.11x, WiFi, wireless universal serial bus (USB), HomeRF, IrDA-based (Infrared Data Association) transmission, etc. The invention is not limited to any wired or wireless mechanisms described herein.

The interface device 130 comprises at least one of a bracelet wearable on the user's arm (e.g., around the biceps or triceps) or a visor wearable on the user's head. The interface device may comprise one or more sensors, microphones, cameras, etc. The interface device 130 comprises at least one sensor that detects a vibration (e.g., a mechanical vibration) associated with the user's body when input is received on the user's skin. In some embodiments, the interface device 130 additionally or alternatively comprises at least one microphone that detects sound associated with input received on the user's skin. For example, a touch on the user's skin causes a particular body part (muscle, bone, tissue, etc.) to produce a distinctive sound. In some embodiments, the interface device 130 additionally or alternatively comprises at least one camera that constantly captures video and captures an image of a touch on the user's skin.

In some embodiments, the sensor may be an infrared (IR) sensor. The IR sensor has the ability to measure IR light radiating from objects in its field of view. In some embodiments, the skin input is detected when an IR source (e.g., the user's finger) touches another IR source (e.g., the user's wrist on which a user interface is projected). The skin input may be detected when both IR sources have different temperatures and/or even when both IR sources have substantially the same temperature. In some embodiments, the camera may an IR camera. The IR camera may capture an IR image of a touch on the user's skin. Since the IR camera uses IR radiation, the IR camera may capture an image of a touch on the user's skin even in darkness (e.g., when ambient light is less than or equal to a threshold level).

In some embodiments, the camera on the interface device may be a three-dimensional (3D) camera (also referred to as a stereoscopic camera). A stereoscopic camera has more than one lens (e.g., two lenses) and more than one image sensor (e.g., two image sensors). Each image sensor is associated with a separate lens. Using multiple image sensor-lens pairs, a stereoscopic camera simulates human binocular vision and enables capture of three-dimensional images. Therefore, the stereoscopic camera may be able to capture a three-dimensional image of the touch on the user's skin. This 3D image may enable the interface device to more accurately determine the location of (and/or touch characteristics) of the touch on the user's skin.

In some embodiments, the sensor comprised in the interface device may be ultrasonic sensor. The sensor may comprise a transducer that generates sound waves in the ultrasonic range (e.g., greater than 18 kHz) by transforming a voltage into sound waves. These sound waves may be transmitted through the user's skin and/or body. The transducer may receive an echo, and convert the echo into a voltage signal. The characteristics of the voltage signal (e.g., waveform shape, amplitude, etc.) associated with the echo may vary based at least partially on a location of and/or a type of touch on the user's skin. Therefore, a processor associated with the transducer (e.g., the processor in the interface device) may be able to determine a location (and/or touch characteristics) of the touch on the user's skin based on characteristics associated with this voltage signal.

In some embodiments, the interface device comprises an electromyography (EMG) module or sensor. In some embodiments, the EMG module comprises a memory and a processor to execute various processes described herein. EMG is a technique for detecting and analyzing electrical activity produced by skeletal muscles. The EMG module may have the ability to detect electrical potential generated by muscle cells when these cells are neurologically or electrically activated. In embodiments described herein, these cells are neurologically or electrically activated when a touch is received on the user's skin. The EMG module (or the EMG module in combination with an external computing device) may be able to analyze the electric potential generated by the activated muscle cells over a period of time to determine a location (and/or touch characteristics) of the touch on the user's skin.

In some embodiments, the interface device comprises a skin conductance or capacitance module or sensor. This skin conductance module may also be referred to as a galvanic skin response (GSR) module. In some embodiments, the EMG module comprises a memory and a processor to execute various processes described herein. The GSR module measures the electrical conductance of the skin which varies based on the skin's moisture level. The sweat glands in the skin are controlled by the sympathetic nervous system, and skin conductance is an indication of physiological or psychological arousal. Therefore, a touch on the use's skin may cause a variation in the electrical conductance of the skin. The GSR module (or the GSR module in combination with an external computing device) may be able to analyze the variation (e.g., over a period of time) in the electrical conductance of a portion of a user's skin to determine a location (and/or touch characteristics) of the touch on the user's skin.

In some embodiments, the vibration and/or sound and/or image and/or the radiated light (e.g., IR light) associated with the skin input may be used by the interface device 130 to detect an approximate position of the input on the user's skin. As used herein, input or touch received on the user's skin refers to a contact (e.g., a physical contact) on the user's skin or in the space (e.g., air space) above the user's skin. As used herein, the skin may be the skin associated with any part of the user's anatomy. Exemplary parts include the head and neck (parts of the body above the thoracic inlet such as the face, ear, nose, tongue, eye, lips, etc.), the upper limb (forearm, arm, elbow, shoulder, hand, wrist, palm, finger, etc.), the thorax, the abdomen, the back, the pelvis, the lower limb (hip, thigh, knee, leg, ankle, foot, toe, etc.), etc.

The touch on the user's skin may be made by a body part of the user (direct touch) or via an object (indirect touch). An example of direct touch is when the user's body part (e.g., the user's left index finger) touches the user's skin (e.g., the user's right palm). An example of an indirect touch is when the user holds a physical object in the user's left hand (e.g., a stylus, a ball-shaped object, a cookie-shaped or chip-shaped object, etc.) and touches the user's skin (e.g., the user's right palm) with the physical object held by the user's left hand. Therefore, in an indirect touch embodiment, the user may not directly touch the user's skin (e.g., the user's right palm) with a body part of the user (e.g., the user's left index finger). As a further example of an indirect touch embodiment, the user touches the user's skin via a band or bracelet wrapped around the user's skin (e.g., the skin on the user's right arm). Therefore, the user may use the user's body part (e.g., the left index finger) to press the band or bracelet against the user's skin on the user's right arm.

The contact with the user's skin may be processed by the interface device 130 to determine an input instruction associated with the contact. For example, the interface device 130 may determine at least one of: a type of contact (tap, drag, etc.) on the user's skin, an approximate location of contact on the user's skin, a duration of contact with the user's skin, a pressure or force associated with the contact on the user's skin, a speed or acceleration associated with the contact with the user's skin, a quantity of distinct contacts with the user's skin, a duration between distinct contacts with the user's skin, a direction of the user's gaze when the contact occurs, or a direction associated with the user's body part when the contact occurs. Each of these determinations may also be referred to as characteristics associated with the user's input or touch. The at least one determination described herein may be used to determine an input instruction (or a gesture) associated with the user's touch. Each input instruction (e.g., select an icon, copy content, transmit content, receive content, move content, close content, etc.) may be associated with at least one determination associated with at least one touch. The various types of touch (tap, drag, etc.) are described later in the specification. As used herein, content may refer to any type of data.

In some embodiments, the interface device 130 may be located on a first user's body, and the touch may be detected on a different user's skin. In such embodiments, the interface device 130 comprises a proximity sensor that detects the touch on the different user's skin, and determines an input instruction (or a gesture) associated with the touch on the different user's skin.

In some embodiments, the interface device 130 comprises a projector (e.g., a microprojector). In some embodiments, the projector of the interface device 130 projects a user interface associated with at least one of the first device, the second device, or the interface device 130 onto at least one of the user's skin or a HMD system display (described later in the specification). In some embodiments, the interface device 130 may be used to project the user interface associated with at least one of the first device 140, the second device 150, or the interface device 130 onto a different user's skin or onto an HMD system display worn by a different user.

As used herein, a user interface is an interface that comprises one or more selectable options. In some embodiments, when the user selects one of the selectable options, the selected option is highlighted while the other selectable options remain unhighlighted. As used herein, highlighting an option may refer to changing the font or color of the option, changing the background color of the option, presenting a border around the option, projecting the option, etc. When the user selects an option, the selection may be detected by the interface device 130. In some embodiments, the selected option is an input instruction to the interface device 130. In other embodiments, the selected option (or the input instruction associated with the selected option) is transmitted from the interface device 130 to at least one of the first device 140, the second device 150, or the HMD system.

In some embodiments, the projector may project an entire user interface associated with at least one of the first device 140, the second device 150, or the interface device 130 onto the user's skin, while in other embodiments, the projector may project partial portions (e.g., menus options, numeric dial pads, alphanumeric keypads, game control options, etc.) of the user interface associated with at least one of the first device 140, the second device 150, or the interface device 130 onto the user's skin.

In some embodiments, the interface device 130 comprises at least one of an image-capturing module or a communication chip (e.g., an NFC chip). The communication chip may be used to transmit data to and/or receive data from at least one of the first device 140, the second device 150, or the HMD system 160. The image-capturing module may be used to determine a direction associated with a user's gaze or determine a direction and/or orientation associated with a user's body part. In other embodiments, the image-capturing module may also be used to capture an image associated with the user's touch on the user's skin.

The interface device 130 is either in contact with or not in contact with the user's skin. Therefore, in some embodiments, the interface device 130 can detect a touch on the user's skin (and process an input instruction associated with the touch) or on a different user's skin regardless of whether the interface device 130 is in touch with or not in touch with the user's skin.

In some embodiments, a tactile tag 190 is part of the system environment. In some embodiments, the tactile tag 190 is separate from the interface device 130 (e.g., the tactile tag is located on a separate band or bracelet to be worn around the user's arm). In other embodiments, the tactile tag 190 is integrated into the interface device 130. When a user touches the user's skin with the tactile tag 190, the interface device 130 may detect a vibration associated with the touch. Additionally, as explained in more detail below, the interface device 130 may detect one or more characteristics associated with the touch. In some embodiments, the interface device 130 may determine at least one input instruction based on the touch characteristics. Additionally, the interface device 130 may identify a target device (e.g., the first device 140, the second device 150, the interface device 130, or the HMD system described below) based on the touch characteristics and transmit the at least one input instruction to the target device. An exemplary input instruction associated the tactile tag touch may be an instruction to transmit or transfer content from the first device 140 to the second device 150. Any description associated with the touch (e.g., of a body part or an object) on a user's skin also applies to the touch of a tactile tag on the user's skin.

Referring now to FIG. 2, FIG. 2 presents another system environment for determining an input instruction based on a touch associated with a tactile tag. The difference between the system environments presented in FIG. 1 and FIG. 2 is the addition of a head-mounted display (HMD) system 160 to FIG. 2. The head-mounted display (HMD) system 160 may also be referred to as a head-mounted device, a helmet-mounted device, a helmet-mounted display system, etc. A HMD system is a display system that may be worn on the head. An HMD system may take the form of eye-glasses, a visor, a facemask, or a helmet, though an HMD system is not limited to these forms. The HMD system 160 may be in communication with the interface device 130 described herein. In other embodiments, the HMD system 160 may replace the interface device 130 such that the HMD system 160 can itself detect input received on a user's skin. In other embodiments, the interface device 130 described herein may comprise at least one of or both the interface device 130 and the HMD system 160.

The HMD system 160 may comprise a communication interface 162, a processor 164, a memory 166, a projector and/or camera or other image-capturing module 169, and a display 168. The communication interface 162 may enable the HMD system 160 to interact with the other devices presented in FIG. 2. The processor 164 may be used to execute an application 167 comprised in the memory 166. Example applications include an application to project an interface (e.g., the interface device interface, the first device interface, the second device interface, etc.) or to determine a direction associated with a user's gaze or a user's body part using the camera or other image-capturing module 169. Additionally, the memory may comprise a datastore 168. The datastore 168 may temporarily or permanently store the data transmitted from the first and/or second device to the HMD system 160.

Each of the devices (the first device 140, the second device 150, the interface device 130, the HMD system 160) displayed in FIG. 2 may communicate with the other devices via one or more wired or wireless mechanisms. Examples of wireless mechanisms include near-field communication (NFC), infrared transmission (IR), Bluetooth, short-range radio frequency (RF) signals, IEEE 802.11x, WiFi, wireless universal serial bus (USB), HomeRF, IrDA-based (Infrared Data Association) transmission, etc. The invention is not limited to any wired or wireless mechanisms described herein.

In some embodiments, an HMD system 160 described herein includes at least one display unit (e.g., display 168) and at least one image-capturing module and at least one light source (e.g., a projector and camera 169). The HMD system 160 may include a display unit in front of only one eye (monocular HMD) or a display unit in front of each eye (binocular HMD). The display unit may be based on cathode ray tube (CRT), liquid crystal display (LCD), liquid crystal on Silicon (LCoS), light-emitting diode (LED), organic light-emitting diode (OLED), etc. Embodiments of the invention are not limited to any particular display technology. An HMD system 160 as described herein may display a computer generated image, a live or delayed image from the real world, or a combination of both images. The HMD system 160 comprises a projector to project an image onto a display of the HMD system 160. In some embodiments, the projector may be a projector associated with presenting overlay information on a display in an augmented reality (AR) system. As used herein, augmented reality (AR) refers to a view (e.g., live view or a delayed view) of a real-world environment where elements of the real-world environment are augmented by computer-generated input such as images, sound, etc. The HMD system 160 described herein may be in communication (e.g., wired or wireless) with the interface device 130 described herein.

In some embodiments, the projector and an image-capturing module (e.g., module 169) in the HMD system 160 may enable gaze tracking In some embodiments, the projector and the image-capturing module comprise a gaze-tracking system. Gaze tracking is the process of tracking the point of gaze (the line of sight associated with an eye or what an eye is looking at) over a period of time. In some embodiments, gaze tracking includes the steps of illuminating the eye using a light source, thereby causing visible reflections from various boundaries of the eye. Some of these reflections may be referred to as Purkinje images. One type of visible reflection that is tracked is the glint. The glint is the small amount of light that is reflected by the cornea. The glint may also be referred as the first Purkinje image.

As used herein, gaze tracking may include the steps of generating the reflection and tracking the reflection. The reflection may be generated by transmitting light into the eye using the projector (or any other light source). In some embodiments, an image-capturing module in the HMD system 160 may be used to capture and/or track various characteristics associated with the glint (e.g., distance, direction, and orientation of the glint with respect to a gaze tracking system, e.g., a light source and/or an image-capturing module). In some embodiments, an orientation as described herein may include at least one of an azimuth, an elevation, or a tilt associated with the glint. In other embodiments, gaze tracking may be performed by tracking both the glint and the position of the eye's pupil or the substantially central portion of the eye's pupil. In still other embodiments, gaze tracking may be performed by tracking the glint and a reflection from the pupil (or a reflection from any other surface or boundary of an eye). In such embodiments, a vector formed by the angle between the glint and the pupil reflection (or a reflection from any other surface or boundary of an eye) may be combined with other geometrical data to determine the gaze direction.

In further embodiments (e.g., a dual-Purkinje gaze tracking system), gaze tracking may be performed by tracking one or more reflections from the front of the cornea (the glint or the first Purkinje image) and from the back of the lens of the eye (the fourth Purkinje image). In such embodiments, data associated with both reflections may be used to determine the gaze direction.

In still further embodiments, gaze tracking may be performed by tracking and/or imaging (i.e., generating an image of) features inside the eye (e.g., the retinal blood vessels). In some embodiments, an image-capturing module described herein has the ability to continue to track and image these features while the eye or various parts of the eye move or rotate. In such embodiments, the image-capturing module may or may not track reflections from the retina. In embodiments where reflections are tracked, the image-capturing module detects, tracks, and images reflections from the retina (or the retinal blood vessels) or changes in reflections from the retina (or the retinal blood vessels) over a period of time.

Embodiments of the present invention are not limited to any particular method to determine the gaze direction. Additionally, in embodiments where the gaze tracking system supports multiple gaze tracking embodiments, the gaze tracking system may allow a user to switch between the various modes. When the gaze tracking system switches between modes, the gaze tracking system may automatically configure itself to perform gaze tracking using the selected mode. For example, when the gaze tracking system shifts from a mode associated with tracking reflections from one or more parts of an eye to a mode associated with tracking and imaging features inside the eye (e.g., retinal blood vessels), the image-capturing module may be configured to automatically change its focus to support the selected mode. In other embodiments, a combination of one or more of the above-described embodiments may be used to determine the gaze direction.

Although gaze tracking is described herein as tracking the glint, embodiments of the invention are not limited to tracking the glint. Embodiments of the invention are directed to tracking a reflection associated with any surface or boundary associated with the eye (e.g., a boundary or surface other than the cornea). Therefore, as used herein, the glint may refer to a reflection from the surface of the cornea or any other surface or boundary associated with the eye.

As described herein, a system for gaze tracking includes both a light source and an image-capturing module. In some embodiments, the light source shines light onto an eye. Embodiments of the invention are not limited to any particular type (or frequencies) of light that can be shone onto the eye. In some embodiments, the light source and the image-capturing module are included in the same system, e.g., a system that comprises a single housing. In alternate embodiments, the light source and the image-capturing module are included in separate systems or separate housings.

An image-capturing module as described herein may include a camera or any component capable of capturing an image or a stream of images (video). The image-capturing module may be a digital camera or a digital video camera. Additionally, the image-capturing module may provide for automatic and/or manual adjustment of a camera setting (e.g., the focus setting). In some embodiments, the image-capturing module comprises an optical sensor in addition to or instead of a camera. The image-capturing module may detect one or more reflections (or change in reflections) from various surfaces associated with an eye, analyze data associated the one or more reflections, and determine the gaze direction based at least partially on the analyzed data.

The image-capturing module described herein may focus on just a single eye or may focus on both eyes and detect and/or record the movement of an eye as the viewer looks at a stimulus. As used herein, a user or viewer of the gaze tracking system may be equivalent. Additionally, the image-capturing module may use one or more techniques to locate or track the pupil or the center (or a substantially central portion) of the pupil. For example, the image-capturing module may use infrared (IR) or near-IR non-collimated light to generate a reflection associated with the cornea or associated with any other part of the eye (e.g., the lens). In some embodiments, the image-capturing module may generate a vector between the center (or a substantially central portion) of the pupil and the generated reflection in order to determine the gaze direction.

A gaze tracking system (or an image-capturing module associated with a gaze tracking system) described herein enables both bright pupil and dark pupil tracking in order to determine the location of the pupil or the center of the pupil. The difference between bright pupil tracking and dark pupil tracking is the location of the light source (e.g., the projector) with respect to the optical path. If the light source is coaxial with the optical path, the eye acts as a retroreflector as light reflects from the retina thus rendering a bright pupil effect. As used herein, a retroreflector is a surface that reflects light back to its source with minimal scattering of light. If the light source is offset from the optical path, the pupil appears dark because retroreflection from the retina is directed away from the image-capturing module. Therefore, an image-capturing module described herein enables either bright pupil tracking or dark pupil tracking based at least partially on whether a light source described herein is coaxial with or offset from the optical path. As used herein, the optical path is a path that light takes in traversing the gaze tracking system.

In some embodiments, at least one of the interface device 130, the HMD system 160, the first device 140, or the second device 150 determines whether the user intends to interact with at least one of the first device 140 or the second device 150. In some embodiments, at least one of the interface device 130, the HMD system 160 (or some other gaze-determining device), the first device 140, or the second device 150 comprises at least one image-capturing module (e.g., a camera or a video camera) that determines the direction of the user's gaze to determine whether the user's gaze is directed at (and consequently whether the user intends to interact with) at least one of the first device 140, the second device 150, the interface projected onto the user's skin, the HMD system 160, or the interface device 130. The information regarding the user's gaze is coupled with input received at at least one of the interface device 130, the HMD system 160, the first device 140, the second device 150, or the user's skin (e.g., via a tactile tag) to determine an input instruction to be executed with respect to the user interface displayed on at least one of the first device 140, the second device 150, the interface projected onto the user's skin, or the HMD system interface. For example if the user is looking at the first device 140 and touches a particular tag on the user's skin or touches a particular tag on a particular portion of the user's skin (e.g., the skin on the left arm or hand), at least one of the first device 140, the second device 150, the interface device 130, or the HMD system 160 determines the user's gaze, along with the interface device 130 detecting the user's touch, in order to determine that the input instruction is an instruction to initiate transfer of content from the first device 140 to the second device 150 and/or the interface device 130.

In some embodiments, at least one of the interface device 130, the HMD system 160 (or some other gaze-determining device), the first device 140, or the second device 150 comprises at least one image-capturing module (e.g., a camera or a video camera) that determines the direction and/or orientation of the user's body part to determine whether the user's body part is pointing at (and consequently whether the user intends to interact with) at least one of the first device 140, the second device 150, the interface device 130, the interface projected onto the user's skin, or the HMD system interface. In some embodiments, the body part may be any part of the upper limb (e.g., forearm, arm, elbow, shoulder, hand, wrist, palm, finger, etc.), or the lower limb (e.g., hip, thigh, knee, leg, ankle, foot, toe, etc.). The parts of the body are not limited to those described herein. The information regarding the direction and/or orientation of the user's body part is coupled with input received at at least one of the interface device 130, the first device 140, the second device 150, the HMD system 160, or the user's skin (e.g., via a tactile tag) to determine an input instruction to be executed with respect to the user interface displayed on at least one of the first device 140, the second device 150, the HMD system 160, or the interface projected onto the user's skin. For example if the user points at the first device with the user's right index finger and subsequently touches the user's skin (e.g., the skin on the user's left upper limb such as the arm or wrist) using a particular tactile tag, at least one of the first device 140, the second device 150, the interface device 130, or the HMD system 160 determines the direction and/or orientation of the user's finger, along with the interface device 130 detecting the user's touch, in order to determine that the input instruction is an instruction to initiate transfer of content from the first device 140 to the second device 150 and/or the interface device 130. As used herein, the orientation of the user's body part refers to at least one of an azimuth, an elevation, or a tilt associated with the user's body part.

In other embodiments a user may simply point at a particular object (e.g., a window) on the first device display with the user's right index finger (or any other body part that enables pointing) and move the right index finger from right to left (without touching the user's skin). An image-capturing module associated with at least one of the first device 140, the second device 150, the interface device 130, or the HMD system 160 captures this movement, and determines that the movement is an input instruction to move a particular object or content from the right edge or center of the user interface of the first device display 140 towards the left edge of the user interface.

As a further example, after content has been transmitted from the first device 140 to the interface device 130, if the user points at the second device 150 with the user's index finger and touches either the same or different tactile tag that caused initiation of transmission of content from the first device 140, the content is transmitted from the first device 140 to the second device 150 (or transmitted from the first device 140 to the second device 150 via the interface device 130). As a further example, after content has been transmitted from the first device 140 to the interface device 130, if the user uses the user's right index finger to point at the user's left palm or if the user causes a touch of a particular tactile tag onto a particular part of the user's skin (e.g., the user's left palm), the content is transmitted from the first device 140 to the interface device 130, and the interface device 130 projects the transmitted content onto the user's left palm.

Referring now to FIG. 3, FIG. 3 presents the parts of the eye described with respect to FIG. 2. The important parts of a human eye 300 include the cornea 310, the iris 320, the pupil 330, the lens 335, the retina 340, and the optic nerve 350. The cornea 310 is the clear outer bulging surface at the front of the eye. The cornea 310 is the major refractive surface of the eye. The iris 320 is the colored part of the eye that regulates an amount of light entering the eye. The pupil 330 is the opening at the center of the iris 320. The iris 320 modifies or adjusts the size of the pupil 330 and thereby controls the amount of light that enters the eye. The lens 335 is the clear part of the eye behind the iris 320 that focuses light on the retina 340. The retina 340 is a light-sensitive tissue lining at the back of the eye. The retina 340 transforms light into electrical signals that are transmitted to the brain via the optic nerve. The aqueous humor 360 is a gelatinous fluid that is located in the space between the lens 335 and the cornea 310. The function of the aqueous humor 360 is to maintain the intraocular pressure and inflate the globe of the eye.

Referring now to FIG. 4, FIG. 4 presents a user interface 400 projected by the interface device onto the user's skin. The user interface may be a user interface associated with at least one of the first device, the second device, the interface device, or the HMD system. The user interface presents the objects (e.g., object 402) that are present on the user interface of the device that transmitted content to the interface device. The object 402 may represent any type of content (or data). The content may comprise at least one of text, video, audio, images, etc. The object 402 may represent an executable object that has not yet been executed (e.g., a selectable icon, which when selected displays a video file). Alternatively, the object 402 may represent an object that is currently being executed (e.g., a video file that is currently being displayed by the device).

Therefore, a user may touch the user's skin with a tactile tag, and the touch (or touch characteristics associated with the touch) is detected by the interface device. The interface device determines an input instruction associated with the touch and transmits the input instruction to at least one of the first device, the second device, or the HMD system (may be referred to as a recipient device). The input instruction at the recipient device triggers content to be transmitted from the recipient device to the interface device. Either the same touch or an additional tactile tag touch on the user's skin results in the interface device projecting the content onto the user's skin.

In some embodiments, the interface device projects the user interface 400 onto a location of the user's skin or a HMD system display as determined by the user (or onto both the user's skin and the HMD system display). In some embodiments, since the area of the user interface 400 (e.g., the user's palm) may be smaller than the user interface area associated with at least one of the first device or the second device, the user interface 400 presents a thumbnail (e.g., a smaller version) of the content transmitted from the device. In some embodiments, the user interface 400 has a quadrilateral shape; however, in other embodiments, the user interface 400 may have other shapes (e.g., circular, elliptical, triangular, polygonal, etc.).

The user may change the location of the projection (e.g., the location on the user's skin or the location on the HMD system display) by inputting a type of touch on the user's skin (e.g., via the user's body part such as the user's fingers, or using a tactile tag), where the type of touch is detected by the interface device. In some embodiments, the location of the touch may be the location of the projection. Therefore, the user may change the location of the projection by touching a different part of the user's skin. In other embodiments, the user may change the location of the projection by transmitting an input directly to the interface device (e.g., by touching the interface device, or selecting an option via an input device (e.g., a remote control device) that is in communication with the interface device).

The user may interact with the user interface 400 similar to a touchscreen display. For example, the user may select a selectable option by touching (or hovering over without touching) the selectable option, and the interface device detects the touch (or the hovering) and determines that the user has selected the selectable option. A processor associated with the interface device processes the selected option and reconfigures the user interface based on the action associated with the selected option. As described in the specification, a touch may refer to at least one of a touch of a body part on the user interface projected on the user's skin or a touch of a tactile tag on the user interface projected on the user's skin.

Referring now to FIG. 5, FIG. 5 presents a band or bracelet 500 that comprises one or more tags 510, 520, and 530, in accordance with embodiments of the invention. In some embodiments, the interface device described herein itself comprises the one or more tags. Therefore, in some embodiments, the bracelet 500 described herein may comprise the tags and the interface device. In some embodiments, multiple bands comprising tags can be worn on (or wrapped around) different parts of the body (e.g., a band on the left elbow, a band on the right knee, a band on the thumb, etc.). In some embodiments, the tags may be detachable from the band. The tags may be detachably attached to the band using one or more attachment mechanisms. The invention is not limited to any particular attachment mechanisms. Although the tags are illustrated as being of a circular shape in FIG. 5, the tags may take other shapes (e.g., triangular, quadrilateral, polygonal, etc.) in alternate embodiments of the invention.

In some embodiments, the band or bracelet 500 comprises piezoelectric microphones. As used herein, a piezoelectric (piezo) microphone uses the phenomenon of piezoelectricity to convert a vibration into an electrical signal. Piezoelectricity is the ability of a material to produce a voltage when subjected to pressure. In such embodiments, the bracelet 500 has features and performs processes described as being performed by the interface device (described above) and/or the tactile device (described below). Therefore, when a tag touches the skin, the piezoelectric microphone detects the vibration associated with the touch and determines an input instruction based on characteristics of the vibration, wherein different types of vibrations are generated by different types of touches on the user's skin (e.g., a first tag's touch on the skin causes a different vibration compared to a second tag's touch, a first type of touch (e.g., a tap touch) on a first tag causes a different vibration when compared to a second type (e.g., a drag touch) of touch on the same first tag, etc.). A processor comprised in or associated with the bracelet may determine an input instruction associated with the vibration in accordance with the embodiments described with respect to the interface device and/or the tactile device.

In some embodiments, the tag produces a vibration in the user's body when the user touches or rubs the tag against the user's skin. Therefore, in these embodiments, the user does not touch the user's skin directly with the user's body part. In some embodiments, the tag is either in contact with the user's skin or is not in contact with the user's skin prior to the user touching or rubbing the tag against the user's skin. The user may touch the tag with any body part of the user. The body parts have been previously described herein. Exemplary body parts include the user's finger, arm, foot, etc.

In some embodiments, the interface device detects that the user has intentionally touched or pressed the tag (and intends to transmit an input instruction) against the user's skin based on comparing a pressure or force associated with the touch to a predetermined pressure or force, and determining that the pressure or force associated with the touch is greater than or equal to the predetermined amount of force or pressure. In other embodiments, the interface device detects that the user has intentionally touched or pressed the tag (and intends to transmit an input instruction) against the user's skin if the amplitude (and/or frequency) of the vibration (or sound) produced by the touch is equal to or greater than a predetermined threshold. In some embodiments, if the pressure or force associated with the touch is less than the predetermined amount of force or pressure or if the amplitude (and/or frequency) of the vibration (or sound) produced by the touch is less than a predetermined threshold, the interface device interprets the touch as an unintentional touch and does not determine an input instruction associated with the touch. Such embodiments are useful when the tag is in constant touch with the user's skin (e.g., when the user is wearing a band comprising the tag), but are also useful when the tag is not in constant touch with the user's skin.

Referring now to FIG. 6, FIG. 6 presents a different view of the tags 510, 520, and 530 presented in FIG. 5, in accordance with further embodiments of the invention. As indicated in FIG. 6, in some embodiments, each tag on a band has a distinct three-dimensional tactile pattern. As indicated in the FIG. 6, at least a portion of the surface of the tag may be raised above the plane of the tag or band 500, and/or at least a portion of the surface of the tag may be depressed below the plane of the tag or band 500. In some embodiments, the tag has a distinct surface texture (and/or feel) so that when the user touches the tag, the user knows which tag the user has touched. As used herein, the surface texture of a tag include one or more distinct ridges, crests, troughs, raised or depressed edges, etc. Additionally or alternatively, the characteristics of the surface texture (e.g., the distance between the various ridges, crests, troughs, raised or depressed edges, etc.) associated with a particular tag are different from the characteristics of the surface texture associated with a different tag. Although not shown in FIG. 6, in other embodiments, the three-dimensional surface texture above the plane of the tag may substantially match the three-dimensional surface texture below the plane of the tag.

In some embodiments where the three-dimensional surface texture above the plane of the tag (i.e., the top surface) substantially matches the three-dimensional surface texture below the plane of the tag (i.e., the bottom surface), the pressing of at least one of the top surface or the bottom surface against the user's skin produces a substantially similar vibration (e.g., vibration frequency, amplitude, etc.) as detected by the interface device. In embodiments where the top surface has a different three-dimensional surface texture from the bottom surface, the pressing of the top surface against the user's skin produces a different vibration (e.g., vibration frequency, amplitude, etc.) when compared to the pressing of the bottom surface against the user's skin. In some embodiments, each vibration is associated with a different input instruction. However, in other embodiments, the interface device may be configured to recognize that both vibrations (i.e., vibrations associated with the top surface and the bottom surface) are associated with the same tag, and therefore, may associate the same input instruction with a particular type of touch associated with the tag. As used herein, pressing the tag against the user's skin and touching the user's skin with the tag may be equivalent.

In some embodiments, the invention provides a printer (e.g., a 3D printer) that can print tactile tags described herein. The user may use a computing system in communication with the printer to select or define a particular three-dimensional surface texture or pattern to etch onto the tag. Once the user is satisfied with the user's selection, the user may print out the tactile tag using the printer. In some embodiments, the tactile tag may be printed on non-rewritable material such that at least one of the three-dimensional surface texture or pattern, or the set of input instructions associated with the tag, cannot be changed. As used herein, an input instruction is associated with a particular type of touch on the tag and/or a particular type of touch characteristic.

In other embodiments, the tactile tag may be printed on rewriteable material. In such embodiments, the tactile tag may be referred to as a dynamic tag because the three-dimensional surface texture or pattern may be modified and altered by passing the tag through the printer again and printing a different three-dimensional surface texture or pattern onto the tag. This different surface texture or pattern may or may not be associated with a different set of input instructions, each input instruction being associated with a particular type of touch on the tag and/or a particular type of touch characteristic.

In other embodiments, the user may change the set of input instructions associated with a tag without reprinting a different surface texture or pattern onto the tag. Therefore, the current surface texture or pattern on the tag may be associated with a different set of input instructions. In some embodiments, the user may accomplish this by using a computing system to communicate directly with the interface device. The user may use the computing system to access the table or database described herein, and may modify the set of input instructions associated with various vibrations produced by the touching of the tag on the user's skin.

In some embodiments, the various detection devices described herein (e.g., the interface device, the bracelet 500, the tactile device described below) may have the ability to predict or determine or reconstruct the signature (e.g., the 3D surface pattern) of a tag based on the vibration produced by the tag when the tag touches the user's skin. Therefore, the detection device may store a table of signatures versus vibration characteristics. The detection device may detect a vibration and determine one or more characteristics (e.g., over a period of time) associated with the vibration (e.g., vibration amplitude, frequency, force, pressure, etc.). The detection device may then compare the determined characteristics with stored vibration characteristics. In response to determining a match between the determined characteristics with stored vibration characteristics (within a predetermined degree of statistical confidence), the detection device may be able to determine or reconstruct the signature associated with the tag that touched the user's skin. The determined or reconstructed signature may be displayed on a display system in communication (e.g., wired or wireless communication) with the detection device. The displayed signature may appear similar to one of the 3D patterns presented in FIG. 6. In other embodiments, the detection device may communicate the determined vibration characteristics to an external computing device that determines or reconstructs the signature of the tag in accordance with the features described herein with respect to the detection device, and displays the determined or reconstructed signature on a display system in communication with the external computing device.

In some embodiments, when the user touches the tag with the distinct tactile pattern, the tag produces a distinct or unique vibration through the user's skin (or body) that is detected by the interface device described herein. Therefore, each of the tags 510, 520, and 530 produces a distinct vibration. In still other embodiments, the tag may produce multiple distinct vibrations, each vibration being generated by a particular type of touch on the tag. For example, a tap-type touch on the tag produces a first type of vibration (associated with a distinct frequency, amplitude, etc.). As a further example, a drag-type touch on the tag produces a second type of vibration (associated with a distinct frequency, amplitude, etc.). As a further example, two successive taps (e.g., the user taps the tag, lifts the user's finger, and taps the tag again) produces a third type of vibration.

In some embodiments, the tags need not be part of a wearable band. In such embodiments, the tag may be directly affixed to the user's skin. In alternate embodiments, the tag may be affixed to the user's clothes (e.g., the user's shirt). The pressing of the tag against the user's skin causes the generation of vibration through the user's skin and/or body. The invention is not limited to any particular affixing or adhesive mechanism to temporarily or permanently affix the tag to the user's skin or clothes.

The tags described herein are useful because they can be used by the user to transmit input instructions when the user cannot directly input instructions to at least one of the interface device, the first device, or the second device. An example environment where this invention is useful is when the user is driving a car. In order to drive safely, the user cannot move the user's arms towards any of the devices described herein, and the user cannot shift the user's gaze towards any of the devices described herein or towards the user's arms. However, the user may momentarily touch, with the user's first arm, a tag affixed on a band worn on the user's second arm in order to generate a vibration that causes the interface device to generate an input instruction. As a further example, a person who has his arms under a desk can, without looking at the person's arms, rub the arm comprising the tag against the other arm, thereby generating a vibration that is detected by the interface device. The interface device may generate a message based on the input instruction associated with the vibration, and transmit the message to its intended recipient.

In some embodiments, when the user is wearing a band or bracelet comprising a tag on one body part (e.g., on one arm), the user may rub or press that arm against a different body part (e.g., the other arm). In such embodiments, the vibration may be generated in at least one of the body part on which the band is worn or in the other body part. In such embodiments, regardless of whether the vibration is produced in one or both body parts, the interface device detects the at least one vibration (e.g., two vibrations), and may be configured to consider the two vibrations as a single vibration. This prevents the generation of multiple input instructions associated with the user's action. However, in alternate embodiments, the interface device may be configured to consider the two vibrations as two separate vibrations. In embodiments where the tag is a stand-alone tag and is not comprised on a band, the user may touch or press the stand-along tag on any part of the user's skin to generate a vibration in the user's skin or body.

In some embodiments, the interface device makes the following determinations regarding the touch on the tag: a type of touch (tap, drag, etc.) on the tag, an approximate location of the touched tag, a duration of the touch, a pressure or force associated with the touch, a speed associated with the touch, a quantity of distinct touches on the tag, a duration between distinct touches on the tag, a direction of the user's gaze when the touch occurs, or a direction associated with the user's body part (e.g., the body part that touches the tag or a different body part) when the touch occurs. Therefore, the interface device may determine an input instruction based at least partially on these determinations. As used herein, a tap touch may be a single touch on the tag, where the duration of the single touch is less than or equal to a predetermined time interval. As used herein, a drag touch may be at least one touch, where the duration of the at least one touch is equal to or greater than the predetermined time interval. In some embodiments, the at least one touch of the drag touch may comprise two or more distinct touches separated by a non-zero time interval.

Each tag is associated with an input instruction as predetermined by the user. Therefore, when the user touches a tag, the tag produces a distinct vibration. The interface device detects the distinct vibration, and determines the input instruction associated with the distinct vibration. The interface device subsequently performs a function associated with the input instruction. The input instruction may be an input instruction associated with at least one of the interface device, the HMD system, the first device, the second device, or any other device not described herein.

In some embodiments, the input instruction is generated based on a predetermined protocol. In some embodiments, the predetermined protocol is stored in the interface device. In other embodiments, the predetermined protocol is stored in a separate device that is in communication (e.g., wireless communication) with the interface device. In such embodiments, the receiving of the vibration at the interface device triggers the interface device to receive the predetermined protocol in order to interpret the input instruction associated with the vibration. Additionally, the protocol may be used to encrypt the input instruction determined by the interface device. Subsequently, the interface device may transmit the encrypted input instruction to any other device described herein.

In some embodiments, the user may associate one or more input instructions for a particular type of touch (or particular type of touch characteristics) associated with a tag. For example, the user accesses a table (stored in the interface device) on a display that is in communication with the interface device. The table may comprise identifying information associated with each tag. The identifying information may comprise a serial number, a name, a location, etc. associated with the tag. The user may select a particular tag. Subsequently, the user may select a particular type of touch (e.g., tap, drag, etc.). Subsequently, the user may select one or more characteristics associated with the selected touch (e.g., an approximate location of the touched tag, a duration of touch, a pressure or force associated with the touch, a speed or acceleration associated with the touch, a quantity of distinct touches, a duration (or interval) between distinct touches, a direction of the user's gaze when the touch occurs, or a direction associated with the user's body part when the touch occurs etc.). The direction of the user's gaze and/or the user's body part may be determined by an image-capturing module associated with the interface device or associated with some other device. Subsequently, the user may select an input instruction to associate with the type of touch and/or the characteristics of the touch. Subsequently, when the user touches the tag, and the interface device detects the vibration and determines the type of touch and/or the characteristics of the touch substantially match the type of touch and/or the characteristics of the touch stored in the table. In response to making this determination, the interface device selects the input instruction identified in the table. As used herein, the table may also be referred to as a database.

An exemplary input instruction is an instruction to project a user interface (e.g., a user interface associated with at least one of the first device, the second device, or the interface device) at the point of contact on the user's skin (e.g., the user's right arm) where the user's body part (e.g., the user's left arm) presses against the tag. This point of contact may be on the portion of the user's skin where the tag is located (e.g., the tag is worn on the right arm). Alternatively, the point of contact may be on the body part where the tag is not located (e.g., the left arm which presses against the tag). In some embodiments, in response to detecting the vibration associated with the touch, the interface device projects a user interface at the point of contact. In some embodiments, the point of contact serves as the center point of the projected user interface (e.g. a circular user interface). In other embodiments, the point of contact serves as one of the corner points of the projected user interface (e.g., a corner point of a quadrilateral user interface).

Other exemplary input instructions may be specific instructions as defined by a user. For example, an input instruction may be to play a particular song using a speaker system located nearby and in communication with the interface device. As a further example, an input instruction would be to transmit audio being played on the speaker to headphones that are worn by the user. As a further example, an input instruction would be to transfer an incoming phone call received by the user's phone (e.g., a portable mobile communication device) to the headphones that are worn by the user. In some embodiments, the phone and the headphones described herein are in communication with the interface device. The exemplary input instructions are not limited to those described herein.

In some embodiments, the interface device executes an action based on the input instruction. In other embodiments, the interface device determines that the input instruction is an instruction to be input to at least one of the first device, the second device, or the HMD system. In such embodiments, the interface device transmits the input instruction to another device. The at least one of the first device, the second device, or the HMD system receives the input instruction and executes an action based on the input instruction.

In some embodiments, the table or database described herein is not stored in the interface device, and is instead stored in at least one of the first device, the second device, or the HMD system. In such embodiments, the interface device detects the vibration caused by the touched tag, and transmits information regarding the vibration to at least one of the first device, the second device, or the HMD system. In such embodiments, the at least one of the first device, the second device, or the HMD system receives the information regarding the vibration, and determines the type of touch and/or characteristics associated with the touch. The at least one of the first device, the second device, or the HMD system subsequently determines whether the determined type of touch and/or characteristics associated with the touch substantially match a type of touch and/or characteristics associated with the touch in the table. If a match is found, the at least one of the first device, the second device, or the HMD system selects an input instruction, and executes an action associated with the input instruction.

In some embodiments, the interface device encrypts, using a predetermined or stored encrypting algorithm, the input instruction generated by the interface device prior to transmitting the input instruction to another device. The other device may have decrypting algorithm to decrypt the input instruction received by the other device. This prevents the input instructions transmitted from the interface device from being tampered with or forged. In some embodiments, the input instructions comprise a message.

In some embodiments, the tag may have capability to communicate (e.g., transmit information to or receive information from) with (e.g., via wired or wireless mechanisms described herein such as RF, NFC, etc.) one or more other devices described herein.

In some embodiments, two or more tags may simultaneously touch or press against the user's body (e.g., the same body part or two different body parts). In such embodiments, the interface device receives vibrations associated with both touches. In such embodiments, the interface device may initially determine that the interface device has received vibrations associated with multiple touches. Subsequently, the interface device distinguishes the vibrations from each other, and determines one or more input instructions associated with each vibration.

Referring now to FIG. 7, FIG. 7 presents a process flow 700 for determining an input instruction based on a touch associated with a tactile tag. The various process blocks presented in FIG. 7 may be executed in an order that is different from that presented in FIG. 7. Additionally, in other embodiments, the process flow may comprise more or fewer process blocks compared to those presented in FIG. 7. At block 710, the process flow comprises detecting, by a device in contact with a user's body, a touch on the user's skin by a tactile tag, wherein the tactile tag comprises a distinct three-dimensional pattern, wherein the distinct three-dimensional pattern causes a distinct vibration in the user's body when a surface of the tactile tag touches the user's skin. At block 720, the process flow comprises determining at least one characteristic associated with the touch. At block 730, the process flow comprises determining an input instruction based at least partially on the at least one characteristic associated with the touch.

In some embodiments, a tactile device is provided. Any of the above-described features or processes associated with a tactile tag are also applicable to the tactile device. The tactile device may have a substantially spherical, elliptical, egg-like, tubular, cuboidal, or cubical body. The shape of the tactile device is not limited to the shapes described herein. The tactile device may comprise one or more piezoelectric microphones comprised within the tactile device body (e.g., on the interior surface of the body) or comprised on the exterior surface of the body. In some embodiments, the one or more piezoelectric microphones may be located deeper in the body, i.e., not on the interior surface. Additionally, the texture or three-dimensional pattern of the exterior surface may vary over the surface area of the exterior surface. For example, a first part of the exterior surface may be associated with a first set of crests and/or troughs, while a second part of the exterior surface may be associated with a second, different set of crests and/or troughs. In some embodiments, the sizes of, distances between, and number of the various crests and troughs on the first part of the exterior surface is different from the sizes of, distances between, and number of the various crests and troughs on the second part of the exterior surface.

As used herein, a piezoelectric (piezo) microphone uses the phenomenon of piezoelectricity to convert a vibration into an electrical signal. Piezoelectricity is the ability of a material to produce a voltage when subjected to pressure.

Referring now to FIG. 8, FIG. 8 presents an exemplary tactile device 800, in accordance with embodiments of the present invention. The tactile device 800 includes a first exterior surface 810 and a second exterior surface 820. The three-dimensional pattern associated with the first exterior surface 810 may be different from the three-dimensional pattern associated with the second exterior surface 820. In some embodiments, the first exterior surface 810 or the second exterior surface 820 may comprise multiple areas or parts, wherein each area or part is associated with a different three-dimensional pattern. The piezoelectric microphones 832, 834, and 836 are also presented in FIG. 8. Microphone 832 may be located on an interior surface of surface 810. Microphone 834 may be located on an exterior surface of surface 820. Microphone 836 may be located deep inside the body of the tactile device 800. The tactile device 800 presented in FIG. 8 is for exemplary purposes only. The tactile device 800 may have a different shape in other embodiments of the invention.

When a user of the tactile device causes a touch between the tactile device and the user's skin, the touch on the user's skin may be detected by the interface device as described previously. However, the touch on the user's skin may also be detected by the at least one piezoelectric microphone associated with the tactile device described herein. The at least one piezoelectric microphone detects a vibration associated with the touch, and the tactile device determines an input instruction associated with the vibration. The input instruction may be based on one or more characteristics of the touch as determined by the tactile device.

For example, the input instruction may be determined based on a type of touch associated with the vibration. The processor located in the tactile device may determine a type of touch based on the determined amount (and/or characteristics) of vibration (e.g., vibration amplitude, frequency, etc.). As described previously, a different type of touch may be associated with a different vibration. For example, a tap touch and a drag touch may be associated with different vibrations.

Additionally, the input instruction may be based on which part of the touch panel device's exterior surface is touched by the user's skin. A touch associated with a different part of the exterior surface of the tactile device body is associated with a different type of vibration because the three-dimensional surface pattern or texture of the surface varies from one part of the surface to another part of the surface.

Additionally, the input instruction may be based on at least one of an approximate location of the touch on the user's skin, a duration of the touch, a pressure or force associated with the touch, a speed or acceleration associated with the touch, a quantity of distinct touches by the tactile device on the user's skin, a duration between distinct touches of the tactile device on the user's skin, a direction of the user's gaze when the touch occurs, or a direction associated with the user's body part (e.g., the body part that touches the tactile device or a different body part) when the touch occurs. The direction of the user's gaze or a direction associated with the user's body part may be determined by an image-capturing module or device located in the tactile device or located in another device (e.g., the interface device, the HMD system, etc.) that is in communication with the tactile device.

In some embodiments, once the tactile device makes the above determinations of the touch characteristics, the tactile device may access a table or database stored in the tactile device. This table may be a table of touch characteristics versus input instructions. Therefore, the tactile device may compare the determined touch characteristics with the stored touch characteristics. In response to determining a match (e.g., equal to or greater than a predetermined threshold of statistical confidence) between the determined touch characteristics and the stored touch characteristics, the tactile device determines one or more input instructions associated with the stored touch characteristics. For example, an input instruction may be an instruction to transmit data from a first device to a second device as described herein. As a further example, an input instruction may be an instruction to project the transmitted data onto the user's skin using the interface device described herein.

In some embodiments, the user may access a computing system that enables a user to communicate with the tactile device and modify the table described herein. For example, the user may modify the table such that an input instruction which previously corresponded to a first set of touch characteristics now corresponds to a second set of touch characteristics.

In some embodiments, the processor may determine an input instruction associated with the touch if the pressure and/or force associated with the vibration is greater than a predetermined threshold (or if the amplitude of the vibration is greater than a predetermined threshold). If the pressure and/or force associated with the vibration is not greater than a predetermined threshold (or if the amplitude of the vibration is not greater than a predetermined threshold), the processor may determine the touch as an unintentional touch and may ignore the touch (i.e., the processor does not determine the type of touch and/or an input instruction associated with the determined type of touch).

Once the tactile device determines the input instruction associated with the touch, the tactile device may then transmit the input instruction to a device (e.g., the first device, the second device, the interface device, the HMD system, etc.) identified by the input instruction in order to manipulate a function associated with the device. Therefore, in some embodiments, the tactile device comprises a wireless transceiver to at least one of send or receive information.

In alternate embodiments, the tactile device may communicate one of more of the above touch characteristics or determinations (e.g., vibration characteristics, type of touch, area of exterior surface that touches the user's skin, an approximate location of the touch on the user's skin, a duration of the touch, a pressure or force associated with the touch, a speed or acceleration associated with the touch, a quantity of distinct touches by the tactile device on the user's skin, a duration between distinct touches of the tactile device on the user's skin, a direction of the user's gaze when the touch occurs, or a direction associated with the user's body part when the touch occurs, etc.) to an external processing device (e.g., the interface device). The external processing device then determines the input instruction based on the received touch characteristics or determinations by accessing a table stored in the external processing device. The external processing device may then transmit the input instruction to a device (e.g., the first device, the second device, the HMD system, etc.) identified in the input instruction in order to manipulate a function associated with the device.

In some embodiments, the tactile device is in contact with the user's skin and a touch (e.g., by a body part or an object) is received on the user's skin away from the point of contact between the tactile device and the user's skin. In such embodiments, the tactile device may detect the vibration associated with the touch and determine an input instruction associated with the vibration based on the previously described embodiments.

In some embodiments, different parts of the tactile device surface may substantially simultaneously (or nearly simultaneously) touch the user's skin. In such embodiments, a vibration associated with each surface's touch of the user's skin may be detected separately and analyzed separately (resulting in separate input instructions) according to the embodiments described above. Therefore, if the vibration force and/or pressure associated with both vibrations is greater than a predetermined threshold, two separate input instructions (or two separate sets of input instructions) may be determined by the tactile device or by an external processing device. In other embodiments, the tactile device may be configured to ignore the vibration associated with the lower force and/or pressure (and/or lower vibration amplitude), and only determines an input instruction for the vibration associated with the higher force and/or pressure (and/or higher vibration amplitude). In such embodiments, a single input instruction (or a single set of input instructions) is determined by the tactile device or the external processing device.

In some embodiments where both the interface device and the tactile device are operational, the interface device and the tactile device may interact with each other to determine whether they have arrived at the same input instruction (or set of input instructions) associated with the touch on the user's skin. This may be a useful checking mechanism prior to communicating (by at least one of the interface device or the tactile device) the input instruction to a device (e.g., the first device, the second device, the HMD system, etc.) in order to control a function associated with the device.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

As used herein, the term "automatic" refers to a function, a process, a method, or any part thereof, which is executed by computer software upon occurrence of an event or a condition without intervention by a user.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for determining an input instruction, the method comprising:
   detecting, by a device in contact with a user's body:
   a first touch on the user's skin by a first tactile tag;
   a second touch on the user's skin by a second tactile tag, wherein the second touch is detected substantially simultaneously with the first touch;
   wherein a tactile tag comprises a three-dimensional pattern, wherein the three-dimensional pattern causes a vibration in the user's body when a surface of the tactile tag touches the user's skin;
   distinguishing a first vibration associated with the first touch from a second vibration associated with the second touch;
   determining whether the first touch is an intentional touch based on a pressure or force associated with the touch being greater than a predetermined pressure or force, wherein an intentional touch is associated with a first input instruction, and wherein an unintentional touch is not associated with the first input instruction;
   in response to determining the first touch is an intentional touch, determining at least one characteristic associated with the first touch;
   determining a direction of the user's gaze when the touch occurs;
   determining a first input instruction based at least partially on the at least one characteristic associated with the first touch and the direction of the user's gaze; and
   determining at least one characteristic associated with the second touch;
   determining a second input instruction based at least partially on the at least one characteristic associated with the second touch,
   wherein the first or second input instruction comprises at least one of selecting an icon, copying content, transmitting content to another device or receiving content from another device.

2. The method of claim 1, wherein the at least one characteristic comprises at least one of a type of touch, an approximate location of the touch, a duration of the touch, a pressure or force associated with the touch, a speed or acceleration associated with the touch, a quantity of distinct touches comprised in the touch, a duration between distinct touches comprised in the touch, a direction of the user's gaze when the touch occurs, or a direction associated with a body part associated with the user when the touch occurs, wherein a first type of touch is a tap touch and wherein a second type of touch is a drag touch.

3. The method of claim 1, wherein the vibration is associated with at least one of a distinct frequency or a distinct amplitude.

4. The method of claim 1, wherein the determining an input instruction based at least partially on the at least one characteristic associated with the touch further comprises:
   determining whether at least one characteristic associated with the touch substantially matches at least one characteristic associated with a stored touch, wherein the stored touch is comprised in a database comprising a plurality of stored touches, wherein the database is located in the device; and
   determining an input instruction associated with the stored touch when the at least one characteristic associated with the touch substantially matches the at least one characteristic associated with the stored touch.

5. The method of claim 1, wherein the input instruction comprises a message, and the method further comprises transmitting the input instruction to another device.

6. The method of claim 1, wherein the tactile tag is detachably affixed to a band or bracelet that is wearable on the user's body.

7. The method of claim 6, wherein the band or bracelet comprises at least one piezoelectric microphone.

8. The method of claim 1, wherein the determining an input instruction based at least partially on the at least one characteristic associated with the touch further comprises:
   determining a pressure or force associated with the touch;
   comparing the pressure or force with a predetermined pressure or force; and
   in response to determining the pressure or force is greater than the predetermined pressure or force, determining an input instruction based at least partially on the at least one characteristic associated with the touch.

9. The method of claim 1, wherein the tactile tag is either in contact with or not in contact with the user's body prior to the detecting step.

10. The method of claim 1, wherein at least some portion of a surface of the tactile tag is raised above a horizontal plane associated with the tactile tag, and wherein at least some portion of the surface of the tactile tag is depressed below the horizontal plane.

11. The method of claim 1, wherein the vibration comprises at least one of a first vibration produced in the user's first body part and a second vibration produced in the user's second body part, and wherein the first vibration produced in the user's first body part is caused by a first surface of the tactile tag touching the user's first body part, and wherein the second vibration produced in the user's second body part is caused by a second surface of the tactile tag touching the user's second body part.

12. The method of claim 1, wherein the input instruction comprises an instruction to project, using the device, a user interface onto a portion of the user's skin.

13. The method of claim 12, further comprising determining an approximate point of the touch on the user's skin, wherein the point of the touch is at least one of a center point or a corner point of the projected user interface.

14. The method of claim 1, further comprising encrypting the input instruction, and transmitting the encrypted input instruction to another device.

15. The method of claim 1, wherein the tactile tag at least one of transmits information to or receives information from the device or a different device.

16. The method of claim 1, further comprising at least one of:
   printing the tactile tag using a printer; or
   enabling modification of at least one of the three-dimensional pattern or an input instruction associated with the touch.

17. The method of claim 1, further comprising reconstructing the three-dimensional pattern associated with the tactile tag based at least partially on the determined at least one characteristic associated with the touch.

18. A system for determining an input instruction, the system comprising:
a device, in contact with a user's body, comprising at least one sensor, microphone, or camera and configured to:
detect a first touch on a user's skin by a first tactile tag;
detect a second touch on the user's skin by a second tactile tag, wherein the second touch is detected substantially simultaneously with the first touch;
wherein a tactile tag comprises a three-dimensional pattern, wherein the three-dimensional pattern causes a vibration in the user's body when a surface of the tactile tag touches the user's skin;
distinguish a first vibration associated with the first touch from a second vibration associated with the second touch;
determine whether the first touch is an intentional touch based on a pressure or force associated with the touch being greater than a predetermined pressure or force, wherein an intentional touch is associated with a first input instruction, and
wherein an unintentional touch is not associated with a first input instruction;
in response to determining the first touch is an intentional touch, determine at least one characteristic associated with the first touch;
determine, using the device camera, a direction of the user's gaze when the touch occurs; and
determine a first input instruction based at least partially on the at least one characteristic associated with the first touch and the direction of the user's gaze;
determine at least one characteristic associated with the second touch;
determine a second input instruction based at least partially on the at least one characteristic associated with the second touch,
wherein the first or second input instruction comprises at least one of selecting an icon, copying content, transmitting content to another device or receiving content from another device.

19. An interface device for:
determining an input instruction;
detecting a first touch by a first tactile device and a second touch by a second tactile device, the second touch detected substantially simultaneously with the first touch, wherein
each of the first and second tactile devices comprises:
a body, wherein an exterior surface of the body comprises a three-dimensional surface pattern, wherein a first part of the exterior surface comprises a first set of crests and troughs and a second part of the exterior surface comprises a second set of crests and troughs;
at least one piezoelectric microphone for detecting a vibration when the tactile device touches a user's skin; and
the interface device, in contact with the user's body, comprises:
at least one of a sensor, microphone, or camera, and
a processor for:
distinguishing a first vibration associated with the first touch from a second vibration associated with the second touch;
determining whether the first touch is an intentional touch based on whether the first vibration is greater than a predetermined threshold, wherein an intentional touch is associated with a first input instruction, and wherein an unintentional touch is not associated with the first input instruction;
in response to determining the first vibration is greater than a predetermined threshold, determining at least one characteristic associated with the first touch,
determining a first input instruction based at least partially on determining the at least one characteristic associated with the first touch and the direction of the user's gaze, wherein the interface device camera determines the direction of the user's gaze;
determining at least one characteristic associated with the second touch;
determining a second input instruction based at least partially on the at least one characteristic associated with the second touch,
wherein the at least one characteristic associated with the first or second touch comprises a type of touch and a determination of which part of the exterior surface of the first or second tactile device touched the user's skin;
wherein the first or second input instruction comprises at least one of selecting an icon, copying content, transmitting content to another device or receiving content from another device.

* * * * *